(12) United States Patent
Kim et al.

(10) Patent No.: US 9,077,050 B2
(45) Date of Patent: *Jul. 7, 2015

(54) LITHIUM SECONDARY BATTERY INCLUDING LITHIUM MOLYBDATE

(75) Inventors: Young-Ki Kim, Yongin-si (KR);
Young-Hun Lee, Yongin-si (KR);
Ick-Kyu Choi, Yongin-si (KR);
Yong-Chul Park, Yongin-si (KR);
Yoon-Chang Kim, Yongin-si (KR);
Hyun-Deok Lee, Yongin-si (KR);
Yong-Chan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 491 days.

This patent is subject to a terminal disclaimer.

(21) Appl. No.: 13/066,031

(22) Filed: Apr. 4, 2011

(65) Prior Publication Data

US 2011/0300418 A1  Dec. 8, 2011

Related U.S. Application Data

(60) Provisional application No. 61/351,717, filed on Jun. 4, 2010.

(51) Int. Cl.
*H01M 4/485* (2010.01)
*F27D 19/00* (2006.01)
*H01M 10/02* (2006.01)
(Continued)

(52) U.S. Cl.
CPC ...... *H01M 10/4235* (2013.01); *Y10T 29/49108* (2013.01); *C01G 39/00* (2013.01); *C01P 2002/72* (2013.01); *C01P 2006/40* (2013.01); *H01M 4/364* (2013.01); *H01M 4/366* (2013.01); *H01M 4/48* (2013.01); *H01M 4/525* (2013.01); *H01M 4/62* (2013.01); *H01M 10/052* (2013.01);
(Continued)

(58) Field of Classification Search
CPC .......... H01M 10/4235; H01M 10/052; H01M 10/52; H01M 10/525; H01M 4/364; H01M 4/366; H01M 4/48; H01M 4/62; H01M 4/525; C01P 2002/72; C01P 2006/40; C01G 39/00; Y10T 29/49108; Y02E 60/122
See application file for complete search history.

(56) References Cited

U.S. PATENT DOCUMENTS 6,346,348 B1 * 2/2002 Nakajima et al. .......... 429/231.5
6,908,710 B2 * 6/2005 Barker et al. .............. 429/231.9
(Continued)

FOREIGN PATENT DOCUMENTS

CN 101615692 A 12/2009
EP 0 391 281 A2 10/1990
(Continued)

OTHER PUBLICATIONS

"Electrochemical Study of Li3Fe(MoO4)3 as Positive Electrode in Lithium Cells" by Alvarez-Vega et al., 152 J. of the Electrochemical Socie​tty, p. A1306-A1311 (2005).*
"Li3V(MoO4)3: A New Material for Both Li Extraction and Insertion", by Mikhailova et al., 22 Chem. Mater (2010) 3165-3173.*
Machine translation of JP 2002-075367 by Odekawa et al.*
"Electrochemical intercalation of lithium in ternary metal molybdates MMoO4 (M: Cu, Zn, Ni, Fe)" by Leyzerovich et al., (2004) J. of Power Sources 127: 76-84.*

(Continued)

*Primary Examiner* — Carlos Barcena
*Assistant Examiner* — Lilia V Nedialkova
(74) *Attorney, Agent, or Firm* — Christie, Parker & Hale LLP (57) ABSTRACT

A lithium secondary battery including lithium molybdate. The lithium molybdate is a composite including semi-crystalline lithium molybdate as a minor component and crystalline lithium molybdate as a major component.

13 Claims, 5 Drawing Sheets
(4 of 5 Drawing Sheet(s) Filed in Color)

(51) Int. Cl.
| | |
|---|---|
| *H01M 4/26* | (2006.01) |
| *F27D 7/00* | (2006.01) |
| *H01M 10/42* | (2006.01) |
| *C01G 39/00* | (2006.01) |
| *H01M 4/36* | (2006.01) |
| *H01M 4/48* | (2010.01) |
| *H01M 4/62* | (2006.01) |
| *H01M 10/052* | (2010.01) |
| *H01M 10/52* | (2006.01) |
| *H01M 4/525* | (2010.01) |

(52) U.S. Cl.
 CPC ............ *H01M 10/52* (2013.01); *H01M 10/526* (2013.01); *Y02E 60/122* (2013.01)

(56) References Cited

U.S. PATENT DOCUMENTS

| | | | |
|---|---|---|---|
| 2004/0121234 A1 | 6/2004 | Le | |
| 2004/0202937 A1 | 10/2004 | Barker et al. | |
| 2009/0068562 A1 | 3/2009 | Yew et al. | |
| 2009/0325072 A1* | 12/2009 | Maeda et al. | 429/220 |
| 2010/0143799 A1 | 6/2010 | Park | |

FOREIGN PATENT DOCUMENTS

| | | |
|---|---|---|
| EP | 2-139-059 A1 | 12/2009 |
| JP | 06-342673 | 12/1994 |
| JP | 11-250907 | 9/1999 |
| JP | 2000-231920 | 8/2000 |
| JP | 2004-363015 | 12/2004 |
| JP | 2005-079077 A | 3/2005 |
| JP | 2005-525990 | 9/2005 |
| JP | 2007-018985 | 1/2007 |
| JP | 2009-146811 | 7/2009 |
| JP | 2010-232029 | 10/2010 |
| KR | 10-2004-0092245 | 11/2004 |
| KR | 10-2007-0008110 | 1/2007 |
| KR | 10-2007-0033880 | 3/2007 |
| KR | 10-2007-0118933 | 12/2007 |
| KR | 10-2008-0100152 A | 11/2008 |
| KR | 10-2009-0025869 | 3/2009 |
| KR | 10-2010-0064632 | 6/2010 |
| WO | WO 03/099715 A1 | 12/2003 |

OTHER PUBLICATIONS

Machine English Translation of Jp 2005-079077 a.

European Search Report dated May 1, 2012; for EP 11168662; 13 pages For EP 2 139 059 A1 and US2004/0202937A1.

Z.R. Silva et al., *Room temperature photoluminescence of $(RE)NiO_3(Re=La,Y,Er,Ho,Nd$ and $LA_{1-x}Y_x)$*, Ceramica 53 (2007) pp. 165-168, 4 pages.

Hironori Kobayashi et al., *Synthesis and electrochemical properties of lithium molybdenum oxides*, Journal of Power Sources, pp. 81-82 (1999) 524-529; 6 pages.

A.C. W.P. James et al., *Structure and Bonding in $Li_{2MoO3}$ and $Li_2MoO3(0<x<1.7)$*, Journal of Solid State Chemistry 76, pp. 87-96, Mar. 7, 1988, 10 pages.

Nobuhiro Kumada et al., *Deintercalation of $Li_2MoO_3$*, Journal of Ceramic Society of Japan, vol. 96, No. 12, Dec. 1, 1988; pp. 1181-1185, 5 pages.

Patent Abstracts of Japan and English Machine Translation of JP 06-342673 listed above, 14 pages.

Patent Abstracts of Japan and English Machine Translation of JP 11-250907 listed above, 17 pages.

Patent Abstracts of Japan and English Machine Translation of JP 2009-146811 listed above, 25 pages.

Patent Abstracts of Japan and English Machine Translation of JP 2010-232029 listed above, 24 pages.

Japanese Office action dated Jan. 22, 2013 for Application No. 2011-124343, 3 pages.

European Patent Office action dated Mar. 1, 2013 in European patent application No. 11168662.2 (5 pages).

SiIPO Office action dated Sep. 3, 2014, with English translation, for corresponding Chinese Patent application 201110156749.1, (21 pages).

KIPO Notice of Allowance dated Sep. 17, 2012 for Korean Patent application 10-20100068581, (5 pages).

U.S. Office action dated May 28, 2014, for cross reference U.S. Appl. No. 13/093,285, (14 pages).

Patent Abstracts of Japan, and English machine translation of Japanese Publication 2004-363015 dated Dec. 24, 2004, (40 pages).

English translation of Kipo Notice of Allowance dated Sep. 17, 2012 for Korean Patent application Oct. 2010-0068581, (8 pp.).

\* cited by examiner

LITHIUM SECONDARY BATTERY INCLUDING LITHIUM MOLYBDATE

CROSS-REFERENCE TO RELATED APPLICATION

This application claims priority to and the benefit of U.S. provisional application No. 61/351,717, filed Jun. 4, 2010, in the U.S. Patent and Trademark Office, the entire content of which is incorporated herein by reference.

BACKGROUND

1. Field

The following description relates to a lithium secondary battery including lithium molybdate.

2. Description of the Related Art

A lithium-ion secondary battery is a type of secondary battery that generates electricity by lithium ions reciprocating between a positive electrode and a negative electrode. A lithium-ion secondary battery includes a positive electrode, a negative electrode, an electrolyte, and a separator. Positive and negative active materials contained in the lithium-ion secondary battery have structures allowing reversible intercalation and deintercalation of lithium ions, thereby enabling charging and discharging.

However, although a positive active material commonly used in lithium batteries such as LCO, LMO, NCM, NCA, and LiFePO$_4$ has high theoretical capacity, the practical capacity is low.

Some positive active materials cannot be applied to batteries, since gas is generated if a large amount of lithium (Li) is extracted from the positive active material due to a structural problem.

SUMMARY

An aspect of an embodiment of the present invention is directed toward lithium molybdate that removes O$_2$ generated in a battery.

Additional aspects will be set forth in part in the description which follows and, in part, will be apparent from the description, or may be learned by practice of the presented embodiments.

An embodiment of the present invention provides and/or synthesizes lithium molybdate. The provided and/or synthesized lithium molybdate includes a minor component in semi-crystalline lithium molybdate phase and a major component in a crystalline lithium molybdate phase.

According to an embodiment of the present invention, a secondary battery includes metal molybdate. Here, at least a portion of the metal molybdate includes semi-crystalline metal molybdate.

In one embodiment, the metal molybdate includes crystalline metal molybdate with the semi-crystalline metal molybdate, wherein the semi-crystalline metal molybdate is provided in a minor amount compared to the crystalline metal molybdate.

In one embodiment, the metal molybdate includes lithium molybdate, the crystalline metal molybdate includes crystalline lithium molybdate, and the semi-crystalline metal molybdate includes semi-crystalline lithium molybdate. In one embodiment, the semi-crystalline metal molybdate exhibits a first X-ray diffraction peak at a diffraction angle (2η) of 20.65°±0.10° and a second X-ray diffraction peak at a diffraction angle (2θ) of 30.50°±0.10°. In one embodiment, a full width at half maximum of a first X-ray diffraction peak (FWHM1) satisfies 0.05° <FWHM1<2.00°, and a full width at half maximum of a second X-ray diffraction peak (FWHM2) satisfies 0.05° <FWHM2<1.00°. In one embodiment, the crystalline lithium molybdate exhibits a third X-ray diffraction peak at a diffraction angle (2θ) of 17.90°±0.10°, a fourth X-ray diffraction peak at a diffraction angle (2θ) of 36.50°±0.10°, and a fifth X-ray diffraction peak at a diffraction angle (2θ) of 43.65°±0.10°. In one embodiment, the semi-crystalline lithium molybdate exhibits a first X-ray diffraction peak at a diffraction angle (2θ) of 20.65°±0.10°, and the crystalline lithium molybdate exhibits a third X-ray diffraction peak at a diffraction angle (2θ) of 17.90°±0.10°and wherein a ratio (h1/h3) of relative intensity of the third X-ray diffraction peak (h3) and relative intensity of the first X-ray diffraction peak (h1) satisfies 0.01<h1/h3<0.10. In one embodiment, the lithium molybdate is represented by Formula 1 below:

$$Li_xMo_yO_z \quad \text{Formula 1}$$

where, in Formula 1, 0<x≤6, 1≤y≤5, and 2≤z≤17.

In one embodiment, the lithium molybdate is represented by Formula 2 below:

$$Li_xMoO_3 \quad \text{Formula 2}$$

where, in Li$_x$MoO$_3$, 2<x≤3.

In one embodiment, the secondary battery is a lithium secondary battery including a separator, the separator including the lithium molybdate.

In one embodiment, the secondary battery is a lithium secondary battery including a positive electrode, the positive electrode including the lithium molybdate.

In one embodiment, the secondary battery is a lithium secondary battery including a positive active material coated with the lithium molybdate.

In one embodiment, the lithium molybdate is at an amount of 0.1 to 50 wt % based on the total amounts of a positive active material.

In one embodiment, the crystalline metal molybdate exhibits a third X-ray diffraction peak at a diffraction angle (2θ) of 17.90°±0.10°, a fourth X-ray diffraction peak at a diffraction angle (2θ) of 36.50°±0.10°, and a fifth X-ray diffraction peak at a diffraction angle (2θ) of 43.65°±0.10°.

An embodiment of the present invention provides a method of preparing a secondary battery. The method includes: synthesizing lithium molybdate; and placing the synthesized lithium molybdate in the secondary battery, wherein the synthesizing of the synthesized lithium molybdate includes: mixing lithium carbonate (Li$_2$CO$_3$) with molybdenum trioxide (MoO$_3$) to form a mixture; heat-treating the mixture to synthesize crude lithium molybdate; and heat-treating the crude lithium molybdate to synthesize the lithium molybdate, wherein at least a portion of the synthesized lithium molybdate is semi-crystalline.

In one embodiment, the heat-treating of the mixture to synthesize the crude lithium molybdate includes heat-treating the mixture at a temperature of 650° C. to 750° C. for a period of 24 hours in a hydrogen atmosphere to synthesize the crude lithium molybdate.

In one embodiment, the heat-treating of the crude lithium molybdate includes heat-treating the crude lithium molybdate at a temperature of 1000° C. to 1100° C. for a period of 10 hours in a reducing atmosphere.

In one embodiment, the lithium molybdate exhibits a first X-ray diffraction peak at a diffraction angle (2θ) of 20.65°±0.10, and a third X-ray diffraction peak at a diffraction angle (2θ) of 17.90°±0.10 and wherein a ratio (h1/h3) of relative intensity of the third X-ray diffraction peak (h3) and relative intensity of the first X-ray diffraction peak (h1) satisfies 0.01<h1/h3<0.10.

An embodiment of the present invention provides a method of operating a secondary battery. The method includes: synthesizing lithium molybdate to include crystalline lithium molybdate as a major component and semi-crystalline lithium molybdate as a minor component; placing the synthesized lithium molybdate in the secondary battery at sufficient amount to remove a desired amount of oxygen generated in an operation of the battery; and removing the desired amount of oxygen generate in the operation of the battery by utilizing the sufficient amount of the synthesized lithium molybdate in the secondary battery.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Provided is a method, according to an embodiment of the present invention, of preparing a positive active material for a battery having high capacity during charging and discharging, long lifetime (lifespan), high stability, and high output by adding semi-crystalline lithium molybdate as an additive to a positive active material in a battery cell. A positive active material, which has not previously been available for use in battery cells because of gas generation, is used with lithium molybdate so as to be used to prepare a battery cell.

If lithium molybdate according to the current embodiment is used alone in a battery as a positive active material or mixed with another positive active material, capacity, lifetime, and stability of the battery may be improved.

A variety of positive active materials have been developed in order to manufacture high capacity and high output batteries. The positive active materials are mixed with semi-crystalline lithium molybdate to improve the capacity and output of the batteries.

In particular, characteristics such as battery stability may be improved by mixing two or three compounds, for example, by mixing semi-crystalline lithium molybdate, $LiCoO_2$, and $LiNiO_2$.

According to one or more embodiments of the present invention, metal molybdate that removes $O_2$ generated in a battery is provided. The metal molybdate includes semi-crystalline lithium molybdate as a minor component and crystalline lithium molybdate as a major component.

Atoms are regularly arranged in the crystalline structure, but are irregularly dispersed in the semi-crystalline structure.

The difference between the semi-crystalline and crystalline arrangements may be identified by X-ray diffraction patterns.

Figure 1:
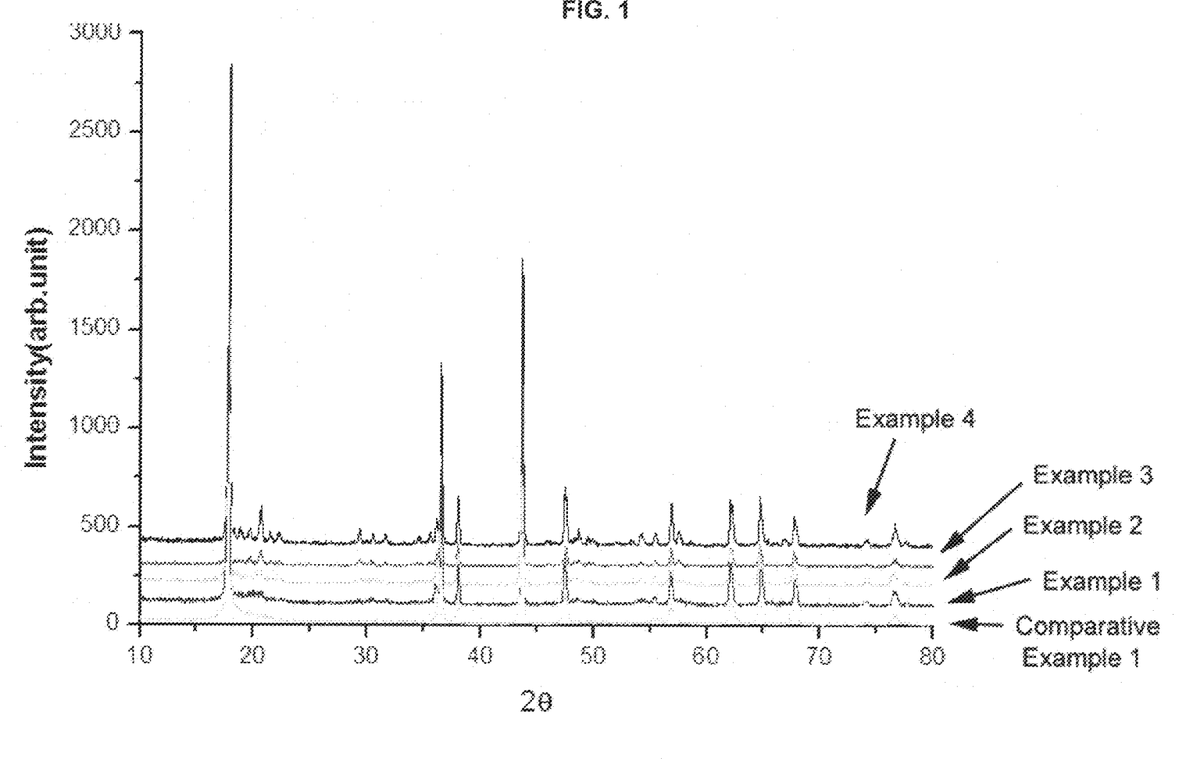
FIG. 1 is an X-ray diffraction graph illustrating atomic arrangements of lithium molybdate prepared according to Examples 1 to 4 and lithium molybdate prepared according to Comparative Example 1.

FIG. 1 is an X-ray diffraction graph illustrating atomic arrangement of lithium molybdate.

Figure 2:
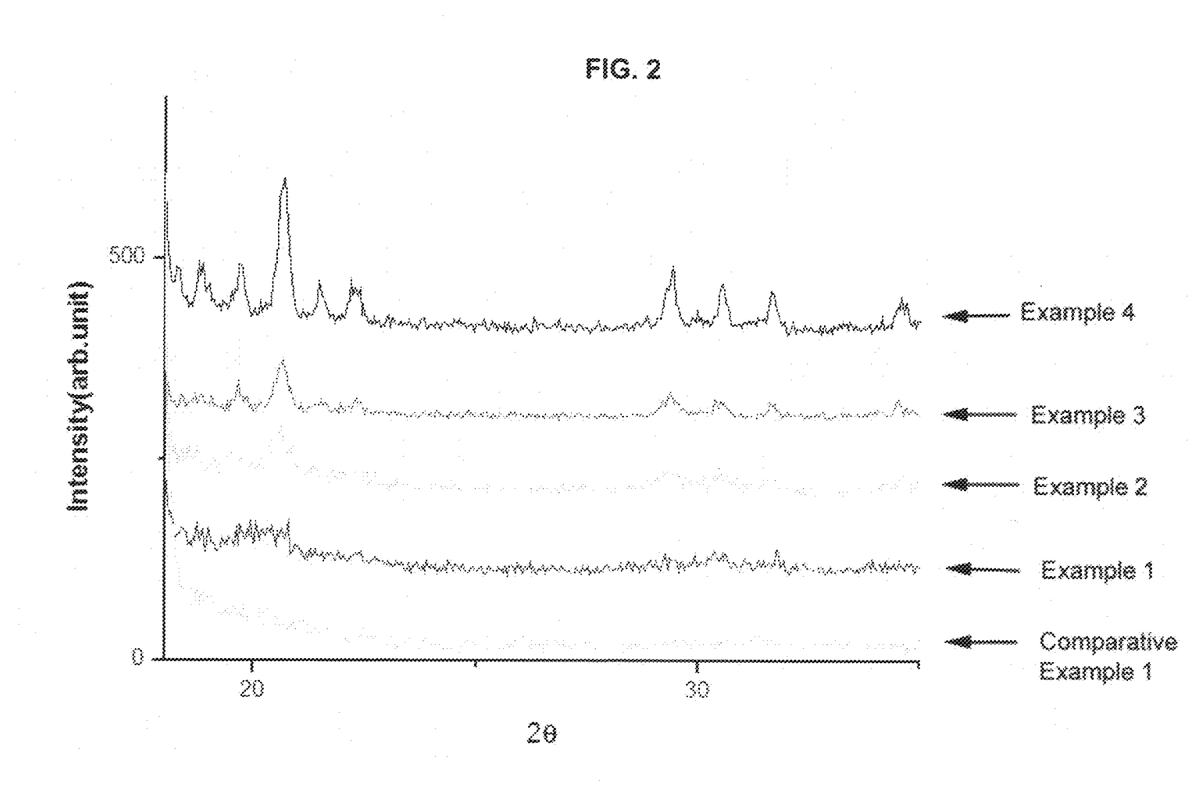
FIG. 2 is an expanded view of a portion of FIG. 1.

FIG. 2 is an expanded view of a portion of FIG. 1.

The metal molybdate according to the current embodiment includes semi-crystalline lithium molybdate as a minor component and crystalline lithium molybdate as a major component. Referring to FIGS. 1 and 2, the semi-crystalline lithium molybdate exhibits a first peak when 2θ is 20.65°±0.1 and a second peak when 2θ is 30.50°±0.1 in the X-ray diffraction graph.

Meanwhile, the crystalline lithium molybdate exhibits a third peak when 2θ is 17.90°±0.1, a fourth peak when 2θ is 36.5°±0.1, and a fifth peak when 2θ is 43.65°±0.1 in the X-ray diffraction graph. These peaks are caused by the regularity of atomic arrangements of lithium molybdate.

The semi-crystalline lithium molybdate exhibits broad first and second peaks and the degree of the broadness may be defined as a full width at half maximum (FWHM).

That is, a full width at half maximum of the first peak FWHM1 satisfies 0.05°<FWHM1<2°, and a full width at half maximum of the second peak FWHM2 satisfies 0.05°<FWHM2<1°.

The amount of the semi-crystalline lithium molybdate used as the minor component may be determined by comparing the intensity of the first peak of the semi-crystalline lithium molybdate and the intensity of the third peak of the crystalline lithium molybdate.

That is, in the metal molybdate according to the current embodiment including the semi-crystalline lithium molybdate as the minor component, the semi-crystalline lithium molybdate exhibits the first peak when 2θ is 20.65°±0.1 in the X-ray diffraction graph, and the crystalline lithium molybdate exhibits the third peak when 2θ is 17.90°±0.1 in the X-ray diffraction graph. The ratio of relative intensity between the third peak, h3, and relative intensity of the first peak, hi, satisfies 0.01<h1/h3<0.1.

The lithium molybdate may be represented by Formula 1 below.

$$Li_xMo_yO_z$$          Formula 1

In Formula 1, 0≤x≤6, 1≤y≤5, 2≤z≤17.

The lithium molybdate may be contained in a separator or a positive electrode of a lithium secondary battery or may be coated on a positive active material of the lithium secondary battery.

A lithium secondary battery according to the current embodiment may be prepared according to the following process.

First, a positive active material, a conducting agent, a binder, and a solvent are mixed to prepare a positive active material composition. The positive active material composition may be directly coated on an aluminum current collector and dried to prepare a positive electrode plate. Alternatively, the positive active material composition may be cast on a separate support and then a positive active material film exfoliated from the support is laminated on the aluminum current collector to prepare a positive electrode plate.

The positive active material may be any lithium-containing metal oxide that is commonly used in the art without limitation. Examples of the positive active material include $LiCoO_2$ (LCO), $LiMn_xO_{2x}$ (LMO), $LiNi_{x-1}Mn_xO_{2x}$ where x=1 or 2, and $LiNi_{1-x-y}Co_xMn_yO_2$ (NCM) where $0 \leq x \leq 0.5$ and $0 \leq y \leq 0.5$.

The positive active material may include semi-crystalline lithium molybdate according to the current embodiment or may be coated with semi-crystalline lithium molybdate according to an embodiment of the present invention.

The conducting agent may be carbon black. The binder may be a vinylidenefluoride/hexafluoropropylene copolymer, polyvinylidenefluoride, polyacrylonitrile, polymethylmethacrylate, polytetrafluoroethylene or a mixture thereof, or a styrene butadiene rubber polymer. The solvent may be one of N-methylpyrrolidone, acetone, water, etc. The amounts of the positive active material, the conducting agent, the binder, and the solvent used are those commonly found in a lithium secondary battery.

Similarly, a negative active material, a conducting agent, a binder, and a solvent are mixed to prepare a negative active material composition. The negative active material composition is directly coated on a copper current collector to prepare a negative electrode plate. Alternatively, the negative active material composition is cast on a separate support, and then a negative active material film delaminated from the support is laminated on the copper current collector to prepare a negative electrode plate. The amounts of the negative active material, the conducting agent, the binder, and the solvent are the same as those suitable for use in a lithium secondary battery.

The negative active material may be any active material that is suitable for use in the art. The conducting agent, the binder and the solvent in the negative active material composition are the same as those in the positive active material composition. If desired, a plasticizer may be added to the positive active material composition and the negative active material composition to produce pores inside the electrode plates.

Any separator that can be suitably used for lithium secondary batteries may be utilized. Particularly, the separator may have low resistance to ion mobility and an excellent electrolyte solution retaining capability. Examples of the separator may include glass fiber, polyester, Teflon, polyethylene, polypropylene, polytetrafluoroethylene (PTFE), and a combination thereof, each of which may be in the form of a nonwoven fabric or a woven fabric. For example, a lithium-ion battery uses a foldable separator formed of polyethylene or polypropylene, and a lithium-ion polymer battery uses a separator having an excellent organic electrolyte solution retaining capability. A method of preparing these separators will now be described in more detail.

A polymer resin, a filler, crystalline lithium molybdate and a solvent are mixed to prepare a separator composition. Then, the separator composition may be directly coated on an electrode, and then dried to form a separator film. Alternatively, the separator composition may be cast on a support and then dried to form a separator film, and the separator film exfoliated from the support may be laminated on an electrode.

The polymer resin is not particularly limited and may be any suitable material that is used as a binder for an electrode plate. Examples of the polymer resin include a vinylidenefluoride/hexafluoropropylene copolymer, polyvinylidenefluoride, polyacrylonitrile, polymethylmethacrylate, and mixtures thereof. For example, the polymer resin may be a vinylidene fluoride/hexafluoropropylene copolymer in which the amount of the hexafluoropropylene is in a range of about 8 to about 25 parts by weight.

The separator may be interposed between the positive electrode plate and the negative electrode plate to form a battery assembly. The battery assembly is wound or folded and encased in a cylindrical battery case or a parallelepiped battery case, and an organic electrolyte solution is then injected into the battery case to complete a lithium-ion battery. Alternatively, the battery assembly may also be laminated to form a bi-cell structure and impregnated with an organic electrolyte solution, and the resultant structure is encased in a pouch and sealed to complete a lithium-ion polymer battery.

The organic electrolyte solution includes a lithium salt and a mixed organic electrolyte solution formed of a high dielectric constant solvent and a low boiling point solvent. If necessary, the organic electrolyte solution may further include various suitable additives such as an overcharge protecting agent.

The high dielectric constant solvent used in the organic electrolyte solution is not particularly restricted as long as it is suitable for use in the art, and may be, for example, a cyclic carbonate, such as ethylene carbonate, propylene carbonate or butylene carbonate; γ-butyrolactone; or the like.

The low-boiling point solvent may also be any suitable solvent used in the art. Examples of the low-boiling point solvent include chain type carbonates, such as dimethyl carbonate, ethylmethyl carbonate, diethyl carbonate, and dipropyl carbonate, dimethoxyethane, diethoxyethane, and aliphatic ester derivatives. However, the low-boiling-point solvent is not limited thereto.

At least one hydrogen atom in each of the high dielectric constant solvent and the low boiling point solvent may be substituted with a halogen atom, such as a fluorine atom.

A volume ratio of the high dielectric constant solvent to the low boiling point solvent may be in a range of 1:1 to 1:9. When the volume ratio is not within this range, a discharge capacity and charge and discharge lifetimes may be reduced.

In addition, the lithium salt used in the organic electrolyte solution may be any suitable lithium salt used in lithium batteries. The lithium salt may include at least one compound selected from the group consisting of $LiClO_4$, $LiCF_3SO_2$, $LiPF_6$, $LiN(CF_3SO_2)_2$, $LiBF_4$, $LiC(CF_3SO_2)_3$, and $LiN(C_2F_5SO_2)_2$.

In the organic electrolyte solution, the concentration of the lithium salt may be in a range of about 0.5 to about 2 M. When the concentration of the lithium salt is less than 0.5 M, the conductivity of the organic electrolyte solution may be decreased. On the other hand, when the concentration of the lithium salt is greater than 2.0 M, the viscosity of the organic electrolyte solution may be increased, and thus the mobility of lithium ions may be degraded.

If the crystalline lithium molybdate according to the current embodiment is coated on a plate in a battery, mixed with a positive or negative active material, or coated on a separator, a battery has high capacity and excellent stability.

The present invention will be described in further detail with reference to the following examples. These examples are for illustrative purposes only and are not intended to limit the scope of the present invention.

EXAMPLES

Example 1

Preparation of Lithium Molybdate 47 g of $Li_2CO_3$ and 91 g of $MoO_3$ were added to a mixer and mixed for 5 minutes. 10 g of the mixture was added to an alumina crucible. The mixture was heat-treated at 700° C. for 24 hours in a hydrogen atmosphere to form crude lithium molybdate. The crude lithium molybdate was heat-treated at 1000° C. for 10 hours in a reducing atmosphere. A synthesized lithium molybdate having a formula of $Li_{2.15}MoO_3$ was formed.

X-ray diffraction (XRD) test results of the synthesized lithium molybdate are shown in FIG. 1.

Example 2

Preparation of Lithium Molybdate

Lithium molybdate was prepared in the same manner as in Example 1, except that the crude lithium molybdate was heat-treated at 1025° C for 10 hours. A synthesized lithium molybdate having a formula of $Li_{2.15}MoO_3$ was formed.

X-ray diffraction (XRD) test results of the synthesized composite lithium molybdate are shown in FIG. 1.

Example 3

Preparation of Lithium Molybdate

Lithium molybdate was prepared in the same manner as in Example 1, except that the crude lithium molybdate was heat-treated at 1050° C for 10 hours. A synthesized lithium molybdate having a formula of $Li_{2.15}MoO_3$ was formed.

X-ray diffraction (XRD) test results of the synthesized lithium molybdate are shown in FIG. 1.

Example 4

Preparation of Lithium Molybdate

Lithium molybdate was prepared in the same manner as in Example 1, except that the crude lithium molybdate was heat-treated at 1100° C for 10 hours. A synthesized lithium molybdate having a formula of $Li_{2.15}MoO_3$ was formed.

X-ray diffraction (XRD) test results of the synthesized lithium molybdate are shown in FIG. 1.

A full width at half maximum of the first peak was 1° when 2θ is 20.65°±0.1, and a full width at half maximum of the second peak was 0.05° when 2θ is 30.50°±0.1.

A relative amount ratio of semi-crystalline lithium molybdate that is contained in crystalline lithium molybdate prepared according to Example 4 as a minor component was measured.

The intensity of the first peak of semi-crystalline lithium molybdate when 2θ is 20.65°±0.1 refers to h1, and the intensity of the third peak of crystalline lithium molybdate when 2θ is 17.90°±0.1 refers to h3. In this regard, h1/h3 was 0.05.

Comparative Example 1

Preparation of Crystalline Lithium Molybdate 47 g of $Li_2CO_3$ and 91 g of $MoO_3$ were added to a mixer and mixed for 5 minutes. 10 g of the mixture was added to an alumina crucible. The mixture was heat-treated at 700° C. for 10 hours in a hydrogen atmosphere to synthesize crystalline lithium molybdate.

X-ray diffraction (XRD) test results of the synthesized lithium molybdate are shown in FIG. 1.

Referring to FIG. 1 and FIG. 2 which is an expanded view of a portion of FIG. 1, XRD test results of the lithium molybdate prepared according to Examples 1 to 4 are different from those of crystalline lithium molybdate prepared according to Comparative Example 1. Peaks that are observed in semi-crystalline lithium molybdate were not observed in Comparative Example 1.

Comparison of Absorption of $O_2$

The adsorption of oxygen ($O_2$) by the synthesized lithium molybdate was identified using differential scanning calorimetry (DSC). $O_2$-adsorbing capabilities of lithium molybdate prepared according to Examples 1 to 4 and crystalline lithium molybdate prepared according to Comparative Example 1 were measured twice per each example using DSC, and the results were compared to each other. In the DSC experiments, LCO was used as a positive active material evolving $O_2$ in the high temperature. The positive active materials of Examples 1 to 4 were mixed with LCO, and then used for the DSC experiments.

Figure 3:
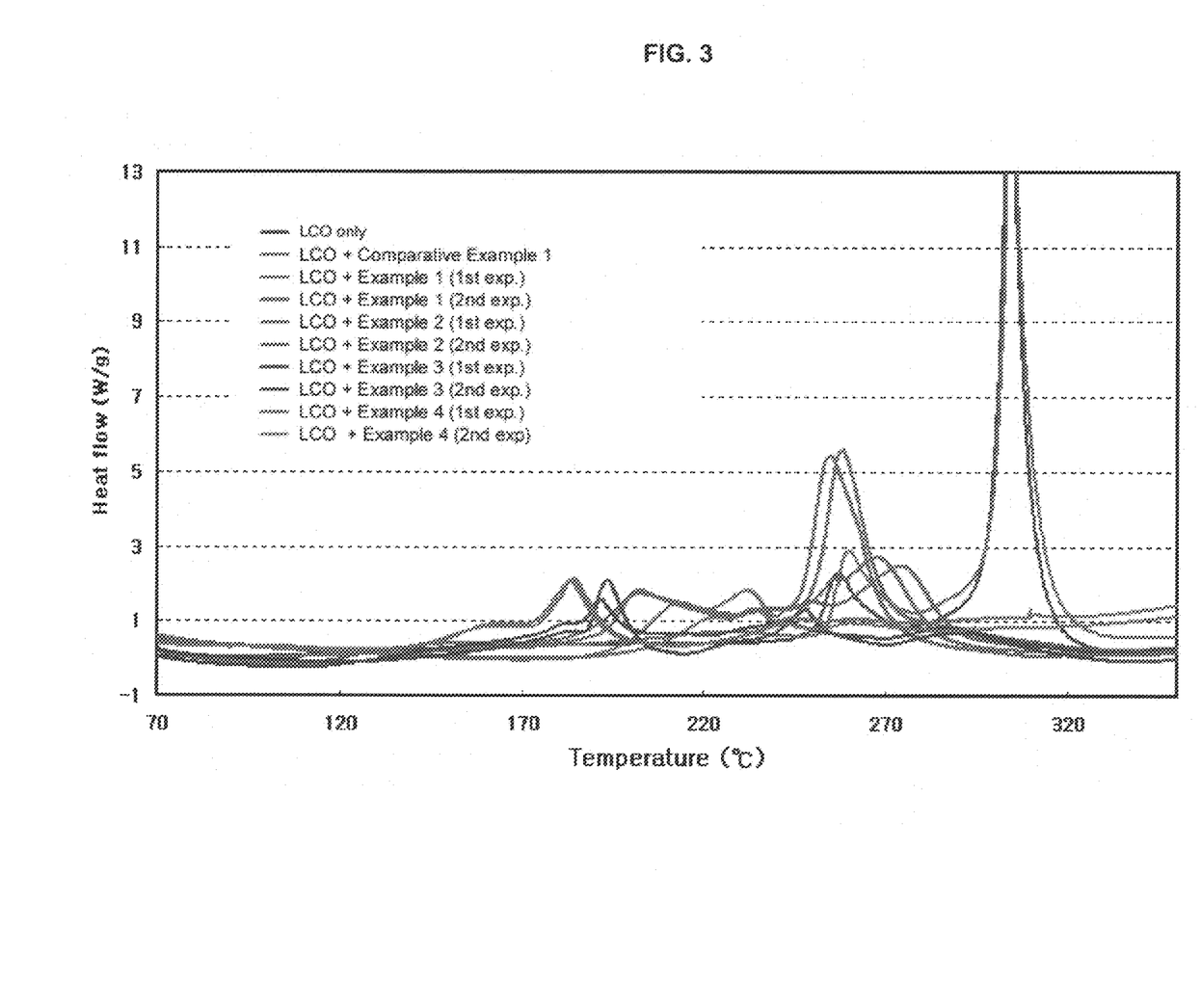
FIG. 3 is a differential scanning calorimetry (DSC) graph illustrating $O_2$-adsorbing capabilities of lithium molybdate prepared according to Examples 1 to 4 and lithium molybdate prepared according to Comparative Example 1.

FIG. 3 is a DSC graph illustrating $O_2$-adsorbing capabilities of lithium molybdate prepared according to Examples 1 to 4 and crystalline lithium molybdate prepared according to Comparative Example 1.

Referring to FIG. 3, a heating amount of lithium molybdate prepared according to Examples 1 to 4 was less than that of crystalline lithium molybdate prepared according to Comparative Example 1. This is because the semi-crystalline lithium molybdate contained in lithium molybdate according to Examples 1 to 4 as a minor component adsorbs more $O_2$ than crystalline lithium molybdate according to Comparative Example 1.

Example 5

Coating Lithium Molybdate on Positive Active Material 100 g of LCO ($LiCoO_2$) was dispersed in 50 g of water, and 1 g of lithium molybdate synthesized according to Example 4 was added thereto.

The mixture was stirred for 30 minutes, added to a crucible, and dried at 120EC for one day. The dried mixture was heat-treated at 300EC for 1 hour in a nitrogen atmosphere to prepare LCO coated with composite lithium molybdate including semi-crystalline lithium molybdate as a minor component.

The LCO coated with the lithium molybdate was analyzed using DSC. It was identified that a DSC heating peak was significantly reduced when lithium molybdate was coated on a positive active material as when the positive active material was mixed with lithium molybdate. The results were almost the same as those of Example 4.

Preparation of Lithium Secondary Battery

Example 6

LCO and lithium molybdate prepared according to Example 4 were mixed in a set or predetermined ratio (8:2), and the mixture was coated on an aluminum (Al)-foil to a thickness of 90 μm to form a thin plate, dried at 135° C. for 3 hours or more, and pressed to have a thickness of 70 μm. The plate was punched in a circle to have a size of 13φ, and processed so as to be suitable for welding. The resultant was welded in a lower portion of a 2032 coin cell and placed in an evacuated vacuum oven at 250° C. for 5 hours. A lithium secondary battery was prepared by assembling the lithium electrode (negative electrode), a separator formed of polyethylene and having a thickness of 20 μm, and an electrolyte solution including a mixture of ethylene carbonate (EC) and ethylmethyl carbonate (EMC) (EM:EMC=3:7 v/v) and 1.3 M LiPF$_6$.

Comparative Example 2

A lithium secondary battery was prepared in the same manner as in Example 6, except that crystalline lithium molybdate prepared according to Comparative Example 1 was used.

Evaluation of Batteries

Figure 4:
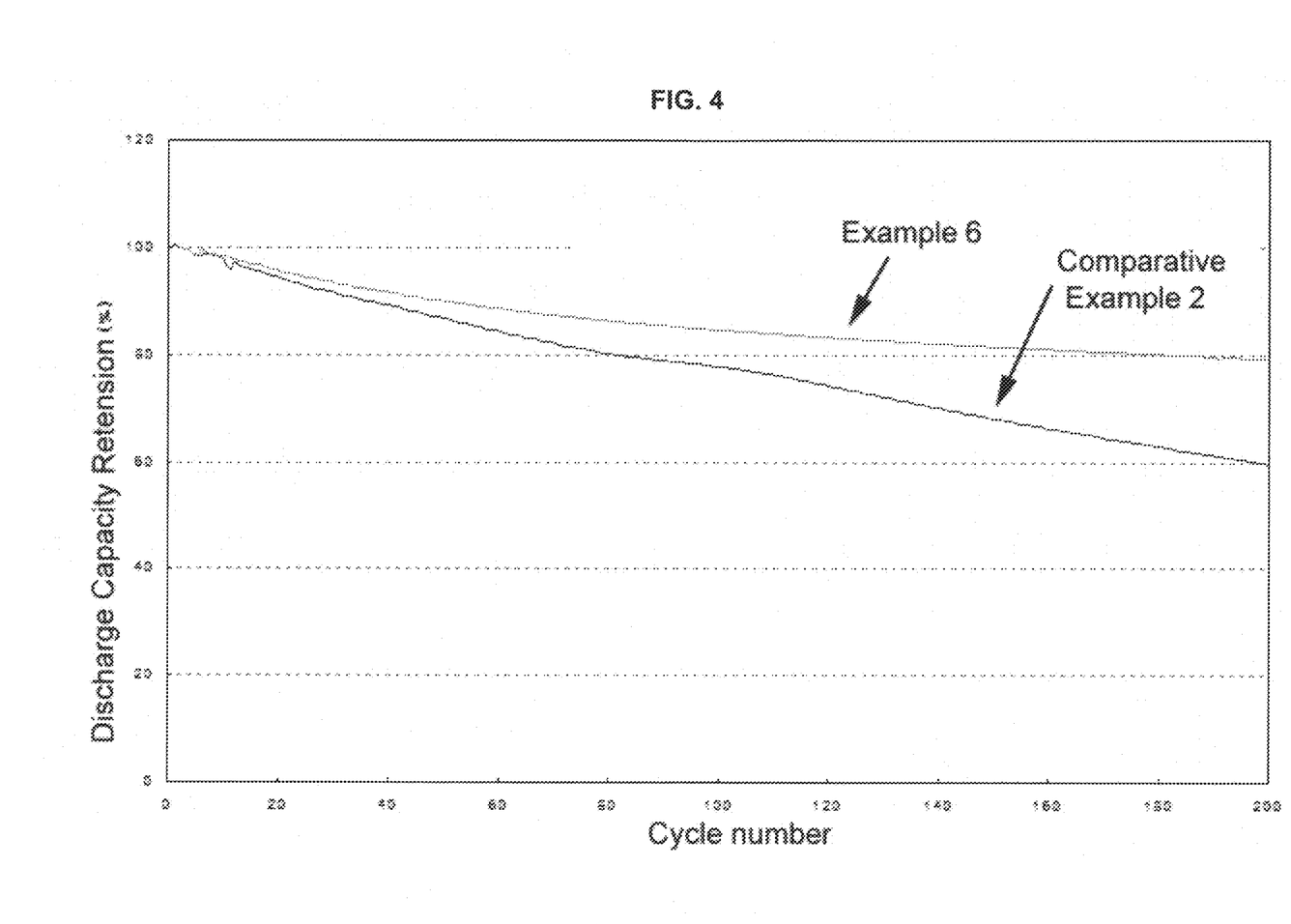
FIG. 4 is a graph illustrating lifetimes of lithium batteries prepared according to Example 6 and Comparative Example 2.

FIG. 4 is a graph illustrating lifetimes of the lithium secondary batteries prepared according to Example 6 and Comparative Example 2.

Referring to FIG. 4, the lithium secondary battery according to Example 6 has a longer cell lifetime than the lithium secondary battery according to Comparative Example 2.

As described above, if lithium molybdate according to one or more of the above embodiments of the present invention is coated on an electrode plate, mixed with a positive or negative active material, or coated on a separator, a battery may have high capacity and excellent stability. In other words, an active material that cannot be used because of low stability, despite a high theoretical capacity, may be used with lithium molybdate in various forms to prepare a battery.

In view of the forgoing, the lithium molybdate according to an embodiment of the present invention is a kind of composite lithium molybdate including a minor component (part) in semi-crystalline lithium molybdate phase and a major component (part) in a crystalline lithium molybdate phase.

In one embodiment, the lithium molybdate is represented by Formula 1 below:

$$Li_xMo_yO_z \qquad \text{Formula 1}$$

where, in Formula 1, 0<x≤6, 1≤y≤5, and 2≤z≤17.

In one embodiment, the lithium molybdate is represented by Formula 2 below:

$$Li_xMoO_3 \qquad \text{Formula 2}$$

where, in $Li_xMoO_3$, 2<x≤3.

In one embodiment, the final composition of lithium molybdate is $Li_{2.15}MoO_3$.

In one embodiment, the lithium molybdate is in a secondary battery and at an amount of 0.1 to 50 wt % based on the total amounts of a positive active material for removing a desired amount oxygen (O$_2$) in the secondary battery.

According to an embodiment of the present invention, a method of preparing a secondary battery is provided. The method includes: synthesizing lithium molybdate and placing the synthesized lithium molybdate in the secondary battery. Here, the synthesizing of the synthesized lithium molybdate includes: mixing lithium carbonate (Li$_2$CO$_3$) with molybdenum trioxide (MoO$_3$) to form a mixture; heat-treating the mixture to synthesize crude lithium molybdate; and heat-treating the resultant to synthesize the lithium molybdate, wherein at least a portion of the synthesized lithium molybdate is semi-crystalline. In one embodiment, the heat-treating of the resultant includes heat-treating the resultant at a temperature of 1000°C to 1100°C t for a period of 10 hours in a reducing atmosphere.

Figure 5:
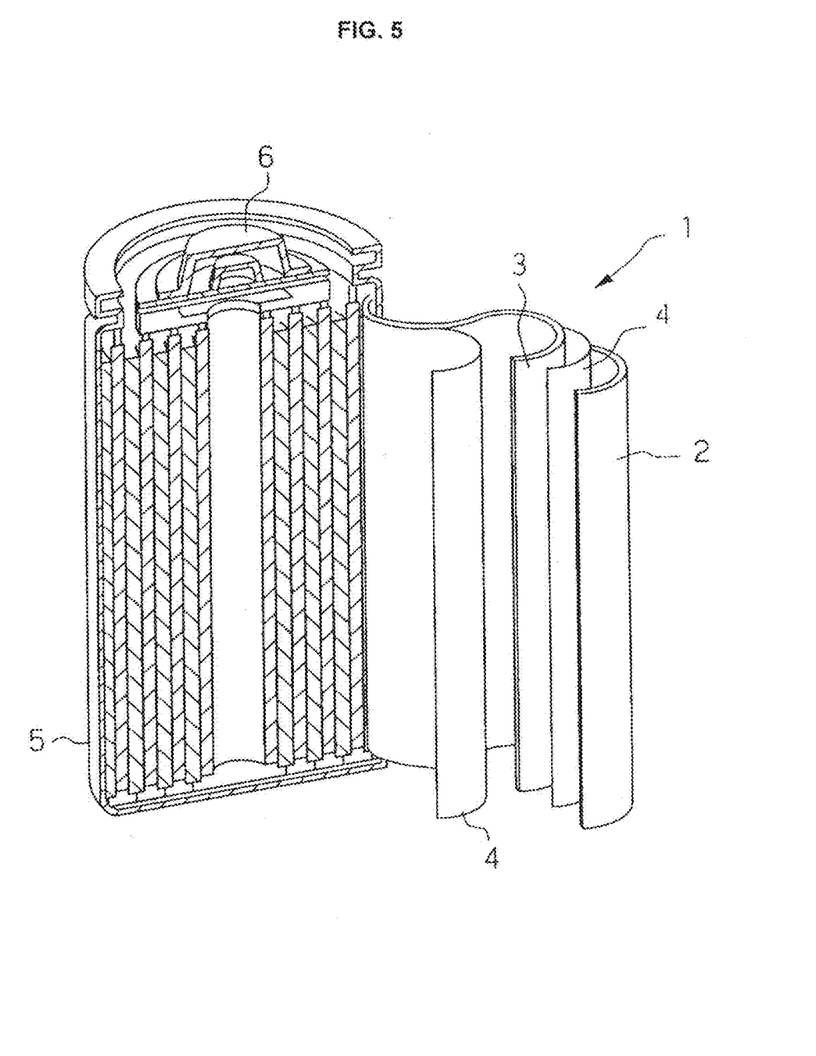
FIG. 5 is a schematic cross-section view of a lithium secondary battery.

In an embodiment of the present invention, a secondary battery (e.g., a lithium secondary battery) is provided which includes the lithium molybdate (e.g., the lithium molybdate in a kind of composite) described above. As shown in FIG. 5, the secondary battery 1 includes an anode 2, a cathode 3 and a separator 4 positioned between the anode 2 and cathode 3. The anode 2, cathode 3 and separator 4 are wound together to form an electrode assembly. The electrode assembly is enclosed within a battery case 5 with an electrolyte, and is sealed with a cap assembly 6.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising lithium molybdate, wherein at least a portion of the lithium molybdate exhibits a first X-ray diffraction peak at a 2θ diffraction angle of 20.65°±0.10° and a second X-ray diffraction peak at a 2θ diffraction angle of 30.50°±0.10°;
wherein the lithium molybdate comprises crystalline lithium molybdate and the portion of lithium molybdate, wherein the portion of lithium molybdate is less in amount than that of the crystalline lithium molybdate;
wherein the lithium molybdate is represented by Formula 1 below:

$$Li_xMo_yO_z \qquad \text{Formula 1}$$

where, in Formula 1, 0<x≤6, 1≤y≤5, and 2≤z≤17.

2. The secondary battery of claim 1, wherein a full width at half maximum of the first X-ray diffraction peak (FWHM1) satisfies 0.05°<FWHM1<2.00°, and a full width at half maximum of the second X-ray diffraction peak (FWHM2) satisfies 0.05°<FWHM2<1.00°.

3. The secondary battery of claim 1, wherein the crystalline lithium molybdate exhibits a third X-ray diffraction peak at a diffraction angle (2θ) of 17.90°±0.10°, a fourth X-ray diffraction peak at a diffraction angle (2θ) of 36.50°±0.10°, and a fifth X-ray diffraction peak at a diffraction angle (2θ) of 43.65°±0.10°.

4. The secondary battery of claim 1, wherein the portion of lithium molybdate exhibits a first X-ray diffraction peak at a diffraction angle (2θ) of 20.65°±0.10°, and the crystalline lithium molybdate exhibits a third X-ray diffraction peak at a diffraction angle (2θ) of 17.90°±0.10° and wherein a ratio (h1/h3) of relative intensity of the third X-ray diffraction peak (h3) and relative intensity of the first X-ray diffraction peak (h1) satisfies 0.01<h1/h3<0.10.

5. The secondary battery of claim 1, wherein the lithium molybdate is represented by Formula 2 below:

$$Li_xMoO_3 \qquad \text{Formula 2}$$

where, in $Li_xMoO_3$, 2<x≤3.

6. The secondary battery of claim 1, wherein the secondary battery is a lithium secondary battery comprising a separator, the separator comprising the lithium molybdate.

7. The secondary battery of claim 1, wherein the secondary battery is a lithium secondary battery comprising a positive electrode, the positive electrode comprising the lithium molybdate.

8. The secondary battery of claim 1, wherein the secondary battery is a lithium secondary battery comprising a positive active material coated with the lithium molybdate.

9. The secondary battery of claim 1, wherein the lithium molybdate is at an amount of 0.1 to 50 wt % based on the total amounts of a positive active material.

10. A method of preparing a secondary battery, the method comprising:
  synthesizing lithium molybdate; and
  placing the lithium molybdate in the secondary battery,
  wherein the synthesizing of the lithium molybdate comprises;
    mixing lithium carbonate ($Li_2CO_3$) with molybdenum trioxide ($MoO_3$) to form a mixture;
    heat-treating the mixture to synthesize crude lithium molybdate; and
    heat-treating the crude lithium molybdate to synthesize the lithium molybdate,
    wherein at least a portion of the lithium molybdate exhibits a first X-ray diffraction peak at a 2θ diffraction angle of 20.65°±0.10° and a second X-ray diffraction peak at a 2θ diffraction angle of 30.50°±0.10°, and wherein the heat-treating of the crude lithium molybdate comprises heat-treating the crude lithium molybdate at a temperature of 1000° C. to 1100° C. for a period of 10 hours in a reducing atmosphere.

11. The method of claim 10, wherein the heat-treating of the mixture to synthesize the crude lithium molybdate comprises heat-treating the mixture at a temperature of 650° C. to 750° C. for a period of 24 hours in a hydrogen atmosphere to synthesize the crude lithium molybdate.

12. The method of claim 10, wherein the lithium molybdate exhibits a first X-ray diffraction peak at a diffraction angle (2θ) of 20.65°±0.10, and a third X-ray diffraction peak at a diffraction angle (2θ) of 17.90°±0.10 and wherein a ratio (h1/h3) of relative intensity of the third X-ray diffraction peak (h3) and relative intensity of the first X-ray diffraction peak (h1) satisfies 0.01<h1/h3<0.10.

13. A method of manufacturing and operating a secondary battery, the method comprising:
  synthesizing lithium molybdate to comprise crystalline lithium molybdate as a major component and a portion of the lithium molybdate exhibiting a first X-ray diffraction peak at a 2θ diffraction angle of 20.65°±0.10° and a second X-ray diffraction peak at a 2θ diffraction angle of 30.50°±0.10° as a minor component;
  placing the synthesized lithium molybdate in the secondary battery at a set amount to remove a set amount of oxygen generated in an operation of the battery; and
  removing the set amount of oxygen generated in the operation of the battery by utilizing the set amount of the synthesized lithium molybdate in the secondary battery;
  wherein the lithium molybdate is represented by Formula 1 below:

$$Li_xMo_yO_z \qquad \text{Formula 1}$$

where, in Formula 1, 0<x≤6, 1≤y≤5, and 2≤z≤17.

* * * * *